US008879719B2

(12) United States Patent
Zgardovski et al.

(10) Patent No.: US 8,879,719 B2
(45) Date of Patent: Nov. 4, 2014

(54) COLLABORATION SYSTEM AND METHOD (71) Applicant: Genesys Telecommunications Laboratories, Inc., Daly City, CA (US)

(72) Inventors: Stanislav V. Zgardovski, Concord, CA (US); Vadim Y. Zyarko, Walnut Creek, CA (US); Oleksiy M. Kolomoyskyy, Moraga, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 13/717,689

(22) Filed: Dec. 17, 2012

(65) Prior Publication Data
US 2013/0208882 A1  Aug. 15, 2013

Related U.S. Application Data (63) Continuation of application No. 12/844,192, filed on Jul. 27, 2010, now Pat. No. 8,363,819.

(51) Int. Cl.
*H04M 3/00* (2006.01)
*H04M 3/51* (2006.01)
*H04M 3/42* (2006.01)

(52) U.S. Cl.
CPC .............. *H04M 3/51* (2013.01); *H04M 3/5158* (2013.01); *H04M 3/42365* (2013.01)
USPC ............ 379/266.07; 379/265.01; 379/265.09; 379/266.08; 705/7.29; 705/14.43; 705/50; 705/1.1; 705/28

(58) Field of Classification Search
USPC .............. 379/265.01–265.14, 266.01–266.09
See application file for complete search history.

(56) References Cited

U.S. PATENT DOCUMENTS

| 5,463,685 | A  | 10/1995 | Gaechter et al. |
| 6,744,878 | B1 | 6/2004 | Komissarchik et al. |
| 7,519,665 | B1 * | 4/2009 | Shimada et al. ............. 709/206 |
| 8,363,819 | B2 | 1/2013 | Zgardovski et al. |
| 2002/0188513 | A1 | 12/2002 | Gil et al. |
| 2003/0161459 | A1 | 8/2003 | McBlain et al. |
| 2004/0223593 | A1 | 11/2004 | Timmins et al. |
| 2004/0240655 | A1 | 12/2004 | Swick |
| 2005/0141694 | A1 | 6/2005 | Wengrovitz |

(Continued)

*Primary Examiner* — Joseph J Nguyen
(74) *Attorney, Agent, or Firm* — Christie, Parker & Hale, LLP (57) ABSTRACT A system for enabling collaboration between two or more customer contact campaigns running within a call center environment includes at least one outbound contact server (OCS) resident on a digital medium, the OCS including an automated dialer application resident on a digital medium thereon or accessible thereto for dialing contact numbers from contact records assembled for the running campaigns, a call monitoring and recording system executing from software on a digital medium, for monitoring call dialing progress and business results of completed calls, a central data repository for storing dialing progress and business results data collected by the running outbound campaigns, and a data sharing mechanism executing from software resident on a digital medium, accessible to each campaign running on the OCS for sharing collected data among the running campaigns. Shared data received by individual campaign instances is processed by the receiving campaign against one or more pre-configured business rules to determine whether to modify campaign contact records, campaign dialing patterns and or campaign dialing methods.

10 Claims, 5 Drawing Sheets

(56) References Cited

U.S. PATENT DOCUMENTS

| | | |
|---|---|---|
| 2006/0146806 A1 | 7/2006 | Khuc et al. |
| 2007/0121914 A1 | 5/2007 | Pearson et al. |
| 2007/0172050 A1 | 7/2007 | Weinstein et al. |
| 2009/0006180 A1* | 1/2009 | Hameen-Anttila ............. 705/10 |
| 2009/0150225 A1 | 6/2009 | Knott et al. |
| 2010/0131410 A1* | 5/2010 | Clement et al. ................. 705/50 |
| 2010/0169252 A1* | 7/2010 | Fan et al. ........................ 706/13 |
| 2011/0055000 A1* | 3/2011 | Zhang et al. ............... 705/14.43 |

* cited by examiner

COLLABORATION SYSTEM AND METHOD

CROSS-REFERENCE TO RELATED APPLICATIONS

This application is a continuation of U.S. application Ser. No. 12/844,192, filed Jul. 27, 2010, the content of which is incorporated herein by reference.

BACKGROUND OF THE INVENTION

1. Field of the Invention

The present invention is in the field of telephony and pertains particularly to methods and apparatus for enabling collaboration between running outbound customer contact campaigns in a call center environment.

2. Discussion of the State of the Art

In the art of telephony, contact centers, also termed call centers or call-in centers in the art may be contracted by businesses to engage their customers in sales and service and handle customer relations management. One aspect of customer engagement known to the inventors is termed outbound customer contact in the art. Proactive customer engagement includes outbound contact services. Outbound contact services may be employed within a contact center environment to sell products and services and/or to service customer accounts. Generally speaking, an outbound customer contact campaign is implemented using supporting telephony hardware and software such as an outbound contact server that includes an automated dialing application for dialing customer contact numbers from a list of contact records approved for outbound dialing.

In one system known to the inventor, the dialing of outbound calls is paced using a pacing algorithm that works to place calls based on known or predicted resource availability. Also known to the inventor is a system for monitoring and detecting dialing states and results of dialing such as the state of busy, no-answer, answer by incorrect party, answer by correct party, wrong number, and so on. When a customer answers an outbound call, it may be routed to an available agent as an inbound call.

In some cases multiple agents are dedicated to outbound contact. Typically, the initial answer of an outbound call is treated by an interactive voice response application whereby the customer may have the options of declination, treatment by a live agent, or treatment by an automated system or process such as an automated order process. In a call center (CC) environment, there may be several outbound contact campaigns running simultaneously and customer records may be accessed by these outbound campaigns from a customer database the records including the telephone numbers to call and at least the identification of the customers.

One problem with the art of proactive outbound customer contact is that while there may be several campaign instances running within a call center environment, there are currently no known mechanisms that enable the separate campaigns to share data such as pre-dialing results, dialing states, and interaction results in real time with one another. Campaigns that run concurrently are relatively isolated from one another accept for possibly sharing access to a data storage system for retrieving contact records data and for checking if individual contacts are on a do-not-call (DNC) list. The isolation of the campaigns from other campaigns increases redundancy in campaign activity and can draw negative results.

Therefore, what is clearly needed is a system for enabling collaboration resulting in corrective action between two or more customer contact campaigns running within a call center environment. A system such as this would reduce redundant activities by the campaigns and would improve overall efficiency and success rate of the campaigns.

SUMMARY OF THE INVENTION

A problem stated above is that information sharing is desirable in an outbound customer contact environment where there are two or more running outbound customer contact campaigns, but many of the conventional means for sharing data between multiple outbound customer contact campaigns such as sharing a central data storage are limited in functionality and require professional configuration processes to implement. Traditional methods for sharing information between running outbound contact campaigns are limited basically to access to do-not-call (DNC) data stored in a shared data repository.

The inventors therefore considered functional elements of a contact center outbound customer contact system, looking for elements that exhibit interoperability that could potentially be harnessed to provide a means for rich information exchange between campaigns but in a manner that would not create complexity or require complex configuration.

The viability of a proactive outbound campaign hinges on an acceptable hit rate one byproduct of which are numbers dialed that do not result in any successful interaction with service persons or automated systems of the contact center contracted by the business entity. Most such outbound contact systems employ contact servers using automated dialing applications to dial the contact numbers store in customer or contact records. Outbound contact servers and dialing applications are typically a part of such apparatus.

The present inventor realized in an inventive moment that if, at the stages of dialing and interaction, campaign information could be shared in a timely manner such as in real time between all of the running campaigns, significant reduction in redundancy and in dialing mistakes might result. The inventor therefore constructed a unique system enabling collaboration between multiple running campaigns in an outbound contact environment that allowed pre-dialing, dialing, and interaction results relative to customer contact events to be shared immediately between all running campaigns in the outbound contact system environment thereby reducing incidences of redundancy and enhancing the efficiency and success rate of the individual outbound campaigns.

Accordingly, in one embodiment of the present invention, a system for enabling collaboration between two or more customer contact campaigns running within a call center environment is provided and includes at least one outbound contact server (OCS) resident on a digital medium, the OCS including an automated dialer application for dialing contact numbers from contact records assembled for the running campaigns, a call monitoring and recording system for monitoring call dialing progress and business results of completed calls, a central data repository for storing dialing progress and business results data generated by the running outbound campaigns, and a data sharing mechanism implemented in software resident on a digital medium accessible to each campaign running on the OCS for sharing collected data among the running campaigns. Shared data received by individual campaign instances is processed by the receiving campaign against one or more pre-configured business rules to determine whether to modify campaign contact records, campaign dialing patterns and or campaign dialing methods.

In one embodiment the call center environment is defined by a single a call center or a federation of call centers. In one embodiment the automated dialer places outbound calls based on predicted resource availability and, or a pacing algorithm. In one embodiment the data is shared between running campaigns over an Ethernet network. In another embodiment the data is shared between running campaigns over the Internet network and connected sub-networks. In one embodiment the data shared includes customer identification, dialed contact number, call progress detection data, and end-of-call data. In a variation of this embodiment end-of-call data is the business result of the call relative to a successful or non-successful outcome.

In one embodiment of the present invention, processing shared data about a completed call at a receiving campaign results in a prioritization of the customer's importance to that receiving campaign. In another embodiment, processing shared data about a completed call at a receiving campaign results in a downgrading of the customer's importance to that receiving campaign. In another embodiment, processing shared data about a call attempt at a receiving campaign results in a removal of the customer record from the call list. In still another embodiment, processing shared data about multiple completed calls at a receiving campaign results in a modification of a dialing parameter for that campaign. In one embodiment the system further includes a call progress detection monitor that generates result statistics about the call attempt such as dialing the wrong number, telephone busy, no answer, machine pickup, answered by incorrect party, or answered by correct party.

According to another aspect of the present invention, in a call center environment, a method for collaborating between outbound customer contact campaigns running in a call center environment is provided and includes the steps (a) using an automated dialer running on an outbound contact server, placing an outbound call from a list of contact records associated with a running campaign, (b) monitoring the progress of the call attempt recording data relative to the current status of the call in progress, (c) if the call is answered, monitoring the progress of the call recording data relative to a positive or negative business result of the call, and (d) propagating the recorded data of steps (b) and (c) to the other running outbound campaigns and storing the data in a central data repository.

In one aspect of the method the call center environment is one of a single call center or a federation of call centers. In one aspect in step (a), the automated dialer places outbound calls based on predicted resource availability and, or a pacing algorithm. In one aspect in step (b), a call progress detection monitor is used to monitor call progress detection. In one aspect in step (b), status of the call includes indication that the call is on a do-not-call list. In another aspect in step (b), the status of the call is one of no answer, machine pickup, busy, answered by correct party, or answered by incorrect party. In one aspect of the method, in step (c), the end business result is one of a sale relative to an offered product or service. In one aspect, the method further includes a step for quantifying campaign success or failure relative to one or more specified parameters associated with the contact records for the campaign the quantified result causing other running campaigns to modify, edit, or reorder their contact records and or dialing settings.

DETAILED DESCRIPTION

The inventors provide a system for enabling data collaboration between running outbound customer contact campaigns in a call center environment for the purpose of optimizing the efficiency and success rates of those campaigns. The present invention is described in enabling detail using the following examples, which may include representation of more than one embodiment of the present invention.

Figure 1:
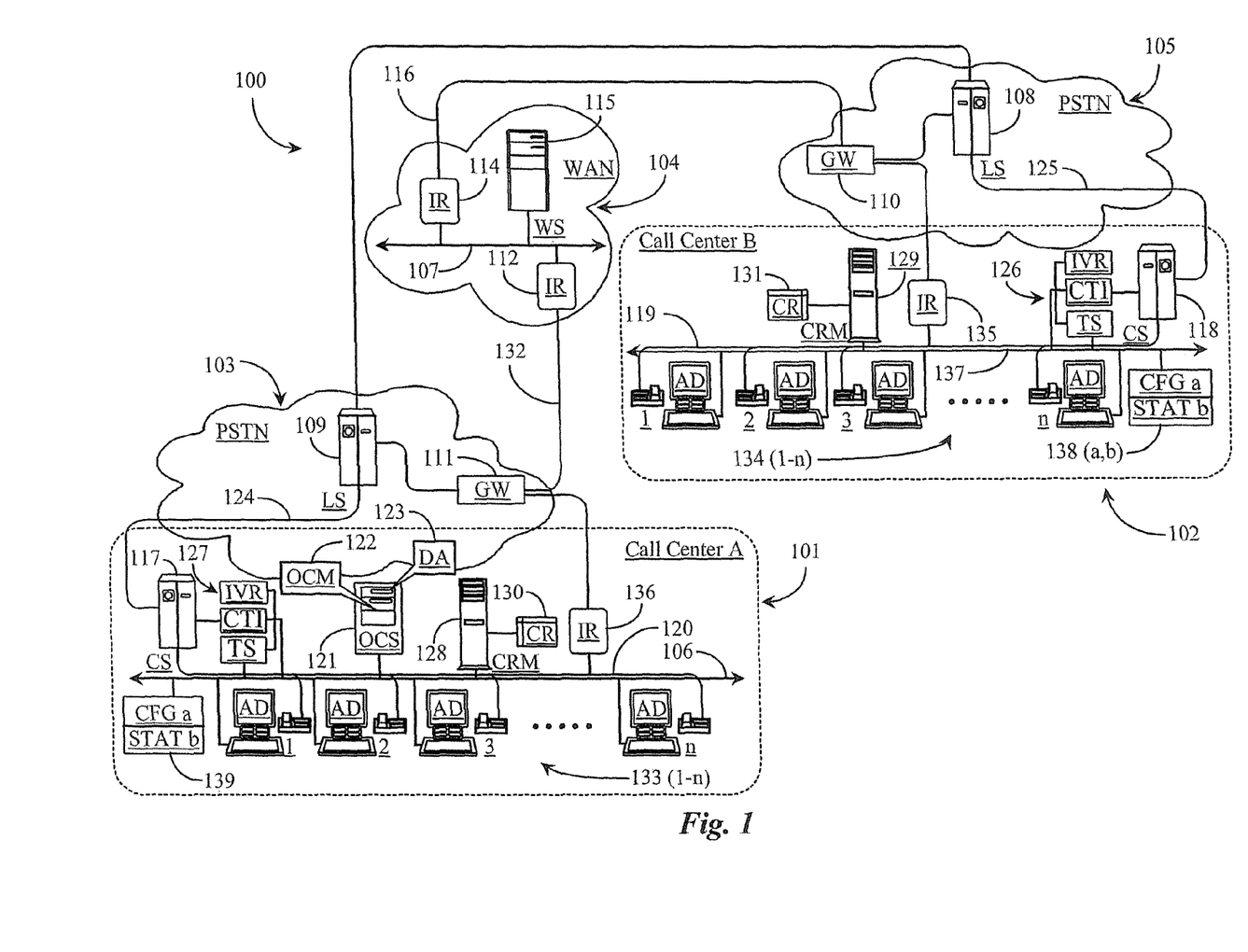
FIG. 1 is an architectural overview of a communications network supporting data sharing among running outbound customer contact campaigns.

FIG. 1 is an architectural overview of a communications network 100 supporting data sharing among running outbound customer contact campaigns. Communications network 100 includes a wide area network (WAN) 104. WAN 104 may be a public WAN such as an Internet network. The inventors prefer that WAN 104 is the well known Internet network because of the public access characteristics. WAN 104 is further illustrated herein by a network backbone 107. Network backbone 107 represents all of the lines, equipment, and connection points that make up the Internet network as a whole, including any connected sub-networks. Therefore, there are no geographic limitations to the practice of the present invention.

Communications network 100 includes a public switched telephone network (PSTN) segment 103 and a PSTN segment 105. PSTN segments 103 and 105 may be public, private, or corporate telephone networks without departing from the spirit and scope of the present invention. The inventors prefer PSTN segments because of the publicly accessible characteristics of those network segments. WAN 104 includes a Web server (WS) 115 connected to backbone 107. WS 115 represents any electronic information page server adapted with a digital medium containing the software and data required to enable function as a Web server. WS 115 may include a Web page provided by an enterprise for customer access.

PSTN segment 105 includes a local telephone switch (LS) 108 that has a telephony trunk connection to another local telephone switch 109 illustrated within PSTN segment 103. LS 108 and LS 109 may be automated call distributors (ACDs) or private branch exchanges (PBXs) or any combination of functional switches including soft switches (software) without departing from the spirit and scope of the present invention. LS 108 is also bridged for communication over WAN 104 via a gateway 110. Gateway 110 has connection to an Internet data router (IR) 114 via an Internet access line 116. IR 114 is adapted to route data from the PSTN in digital format over backbone 107. LS 109 in PSTN segment 103 has a bridged connection to WAN 104 via a gateway 111 connected to an IR 112 by an Internet access line 132. LS 108 in PSTN segment 105 have a trunked connection to LS 109 in PSTN segment 103. PSTN segments 103 and 105 are meant to logically represent geographically disparate portions of the PSTN and do not represent separate isolated networks.

Communications network 100 includes a call center A (101) and a call center B (102). Call center A, also termed call center 101, includes a local area network (LAN) 106 provided therein and adapted for transfer control protocol/Internet protocol (TCP/IP) and other Internet protocols enabling LAN 106 to function as a sub-network to Internet 104. Call center 101 may be assumed a state-of-art center that may interact with customers via analog voice and digital voice as well as other digital communications mediums.

Call center 101 has a central telephone switch CS 117 that is computer telephony integrated (CTI) via a CTI processor group 127, which includes a CTI processor connected to CS 117 by a CTI link and to LAN 106 via a LAN connection. CTI group 127 also includes an interactive voice response (IVR) system and a transaction server (TS). IVR of CTI group 127 is adapted to intercept incoming calls for IVR interaction and to engage customer who answer outbound calls placed to their contact numbers by the call center. Other server components in call center A include a configuration server (CFG) 139a, and a statistics server (STAT) 139b.

LAN 106 supports a contact records server (CRS) 128 adapted with a digital medium containing all of the software and data required to enable a CRS function. CRS 128 includes a connected repository 130 adapted to contain contact records (CR). Contact records are data sets that include customer identification and contact information that might be used by the call center to make contact with customers of the represented enterprise. Call center 101 may represent one enterprise or it may provide contact services for many enterprises, each with their own customer base. CRS 128 may be a customer relations management (CRM) server without departing from the spirit and scope of the invention. Contact records address the availability of numbers etc. that may be used to make outbound contact with the customer.

Servers described in this specification may be physical hardware-based servers having a digital medium installed thereon which contains all of the software and data required to enable server function for that type of server. Servers described in this specification may also be software-based servers installed on a digital medium generic to a computing device or system without departing from the spirit and scope of the present invention. Servers may be standalone hardware/software implements or may be combined as software implements on a powerful computing machine. Servers not mentioned in this specification, but sometimes present in a call center include application servers and routing servers, among others.

CS 117 within call center 101 is connected to LS 109 in PSTN segment 103 by a telephony trunk 124. LAN 106 supports an Internet data router (IR) 136 that has connection to gateway (GW) 111 in PSTN segment 103. GW 111 in PSTN segment 103 has direct connection to WAN 104 via an Internet access line 132 and an Internet data router IR 112. Call center 101 may receive interactions from the telephone network and from the Internet network.

LAN 106 within call center 101 supports multiple agent workstations 133 (1-n). Each agent workstation 133 (1-n) includes a computing appliance and a telephone. In this example the computing appliances are desktop computers and the telephones are PSTN phones connected to CS 117 via internal telephone wiring 120. Agent stations 133 (1-n) may include other equipment types without departing from the spirit and scope of the present invention. For example, SIP telephones may be used in place of analog telephones. Laptop computers may replace a desktop computer as the computing appliance. PBX phones, IP headsets, personal digital assistants PDAs, cellular phones, facsimile machines, video phones, and the like may be included in the scope of agent communication equipment.

Call center 101 includes an outbound contact server (OCS) 121 connected to LAN 106. OCS 121 has a digital medium provided thereon or accessible thereto that is adapted to contain all of the software and data required to enable function as an outbound contact server. OCS 121 is adapted with the aid of a dialing application (DA) 123 to place outbound telephone calls to customers. OCS 121 has operational control of CTI telephone switch 117, which is used to place the calls through the PSTN network. Outbound calls that are answered may be routed to a group of agents presumed operating agent workstations 133 (1-n) in this example. An agent group may be a set of dedicated telephones manned by agents or it may be a set of geographically distributed telephones answered by agents, some of whom may be stations at remote locations such as in other call centers, working from home, or from another part of the call center. In this example an agent group shall refer to a group of agents in-house and connected to LAN 106.

An outbound customer contact campaign is typically not a permanent and tangible object. Rather, an outbound campaign is created to run on OCS 121 and take no direct form until it is running on the server. OCS 121 may support more than one or several outbound customer contact campaigns in any given work period. For example, a first outbound campaign may be created to thank customers for purchasing a specific model of computer. A second running outbound campaign running on the same OCS may ask essentially the same customer base if they would like to install the newest update designed for the computers they purchased.

Outbound contact campaigns can run alone or in conjunction with other campaigns on the server. Likewise, there my be more than one running outbound customer contact campaign on the server and also campaigns that are scheduled to run but have not yet started. Each outbound campaign instance that is created and started on the server has its own version of outbound contact manager (OCM) 122 installed. OCM is known to the inventor as a graphics user interface (GUI) that enables a call center operator or agent to start, stop, edit, and view various components of the running campaign. Some of these components include agent groups, pacing parameters, dialing modes, and so on. An OCM is a tool that enables a user to manage the campaign.

In this example, call center B (102) is very similar in equipment and dynamics to call center A (101). Call center 102 includes a LAN 137 adapted for IP communications as described previously with LAN 106 of call center 101. LAN 137 within call center 102 supports multiple agent workstations 134 (1-n) for communications. In this example, call center 102 includes a central switch (CS) 118 having connection to LS 108 within PSTN segment 105 via a telephone trunk 125. CS is CTI-enabled via a CTI processing component group 126, which includes an interactive voice response (IVR) and a transaction server (TS) as was previously described with reference to call center 101. Agent telephones in agent workstations 134 (1-n) are connected to CS 118 via internal telephony wiring 119. LAN 137 also supports a configuration (CFG) server component 138a and a statistics (STAT) server component 138b. LAN 137 supports a contact records server (CRS) 129 connected to a contact record (CR) repository 131. Contact center 102 has Internet access via an Internet data router (IR) 135 connected to LAN 137 and to GW 110 in PSTN segment 105. GW 110 in turn has direct connection to IR 114 within WAN 104.

A major difference between call centers 101 and 102 is that call center 102 has no automated system for making proactive outbound telephone calls to customers. In this example, OCS 121 in call center A (101) can make outbound telephone calls for agents working in remote agent workstations 134 (1-n) in call center B (102), as well as for call center A. Call centers A and B may be part of a federation of call centers without departing from the spirit and scope of the present invention. Work stations 133 (1-n) in CC 101 and work stations 134 (1-n) in CC 102 are each equipped with an instance of agent desktop (AD). Agent desktop is a SW graphics user interface (GUI) that enables call center agents to interact with the contact center system and to enable specific agent duties and actions related to call center business including call routing, call notification, call transfer, custom result reporting, and other capabilities. An agent desktop application is not required in order to practice the present invention.

To create an automated outbound customer contact campaign, one or more agents must be designated to answer calls transferred from the outbound campaign. In general, as customers answer calls placed to them by the system, agents that are available or that are predicted to be available at the time of the outbound call placement are "grabbed" by the system so that they may answer calls. In some cases connected outbound calls are queued for agent assistance. In one embodiment outbound calls are scheduled to be manually dialed by available agents. In this case the outbound system sends outbound call requests directly to available agents and IVR interception is not required.

In a system known to the inventors, outbound call attempts by the OCS are monitored in terms of calling progress by what is termed call progress detection (CPD). CPD informs of certain states in the call attempt such as busy, no answer, disconnect, machine answer, and so on. When a call is answered, an interaction monitor may be utilized to determine if the call is answered by the correct party or incorrect party. Other details about the call attempt may be detected such as if the number called was a wrong number. The outbound system may check numbers against a DNC list to ensure that customers that are on that list are not called by the automated system unless there is already a relationship with the customer that warrants the call by permission of the customer.

During interaction with customers reached through outbound contact, agents and automated monitoring of the interaction may determine yet more states about the call and about the customer. For example, emotion detection can be employed during interaction with the customer to determine the overall mood of the call. For example, the customer may be perturbed and complaining. The agent on the call may be overly aggressive or impatient. At the end of the interaction or after the interaction is over for a call, the agent may report a business result such as a sale, a request for call back at another time, a refusal to upgrade to new software, or some other type of business result.

The type of data that are discoverable during an outbound calling campaign may effect future treatment options and preferred call center procedures. The collected data is typically used to fine tune procedures and approaches, but is typically not available to another running campaign that may be operating on the exact same contact records list. In one embodiment of the present invention, the inventors enable created outbound customer contact campaigns to share information in real time as call attempts are made during the execution and run of those campaigns.

In practice of the present invention, OCS 121 receives one or more contact record (CR) lists from CRS 128 and perhaps from CRS 129 of federated CC 102 in a federated environment. Also in a federated environment, destination (DN) agents may comprise agents operating from workstations 133 (1-n) and from workstations 134 (1-n) in CC 102. The CR lists contain at minimum customer or contact identification and at least one number where the contact can be reached. Each CR list represents the customers from a customer base of the product/service-providing company that the system will attempt to contact.

In one embodiment a CR list contains only the customer identification and the telephone number to reach the customer. In one embodiment a CR list contains more than one contact number and/or contact option. In a preferred embodiment, a running campaign may edit contact records and software settings in order to maximize the efficiency and success of the campaign based on what data was found to be relevant to the campaign. In order for this to occur, a piece of software (SW) not illustrated here is provided to the campaign instance and adapted to enable that campaign instance to report or share information with other campaign instances in real time as it is discovered during call attempt and interaction.

Some call attempt results and interaction business results are moot or simply have no relevancy to any other CC situation. On the other hand, certain information made available to other campaigns could benefit those campaigns in ways that are not currently realized in the art. As OCS 121 places outbound telephone calls with the aid of DA 123, it listens for update data from other running campaigns. If some relevant data is acquired by the campaign instance it may process that data using host or other processing resources against one or more business rules (not illustrated) in order to determine what if any action should be taken next. An example of relevancy of data acquired by one running campaign from another might be where one campaign gets a wrong number result for a primary contact number. The campaign may share this result with all of the other running campaigns that might be dialing the same customer during the course of their campaign run times. The one or more other campaigns may delete the "wrong number" and call the next listed priority number or may attempt to retrieve a correct contact number from another database.

Another example of relevancy of data results shared with other campaigns might be where one campaign is having an above average success rate by calling customers residing in a specific zip code area. The difference in success rate between that campaign and the closest "other campaign" might exceed a preset threshold causing the other campaigns to prioritize calls to customers in that specific zip code area when making their own calls during the same period. In this case the business result shared is that better overall numbers are resulting from calling customers in a specified zip code area. After receiving the data, other campaigns may switch over to calling the customers on their respective contact record lists that reside within the geographic boundaries of the communicated zip code. It may be important for all of the campaigns that the higher rated zip code areas be covered earlier during the campaign runtimes that correspond to a general time of the day. Hit rate may be naturally lower as the day wanes making it important to prioritize higher probability calls. There are many different scenarios that are possible.

In a federated environment OCS 121 places calls for campaigns of CC 101 and campaigns of CC 102. Outbound calls are routed by DN from LS 109 to customers connected to PSTN segment 102 and from LS 109 to LS 108 in PSTN segment 105 before being routed to end customer appliances. Agents are not required to reside within CC 102 or within CC 101 in order to practice the present invention. Agents may be connected remotely to their respective centers through subnetworks and may be part of virtual agent groups recruited, invited, or otherwise notified to take outbound calls under a specific campaign. It is also noted that one agent may work simultaneously for more than one campaign. Outbound calls that are connected at switch 109 and 108 may be routed to respective CC agents working outbound campaigns within the respective call centers or from one or more remote locations. It will be apparent to one with skill in the art that the outbound contact campaign data collaboration system and methods can be practiced within a single call center or in the domain of a federated system of call centers without departing from the spirit and scope of the present invention.

Figure 2:
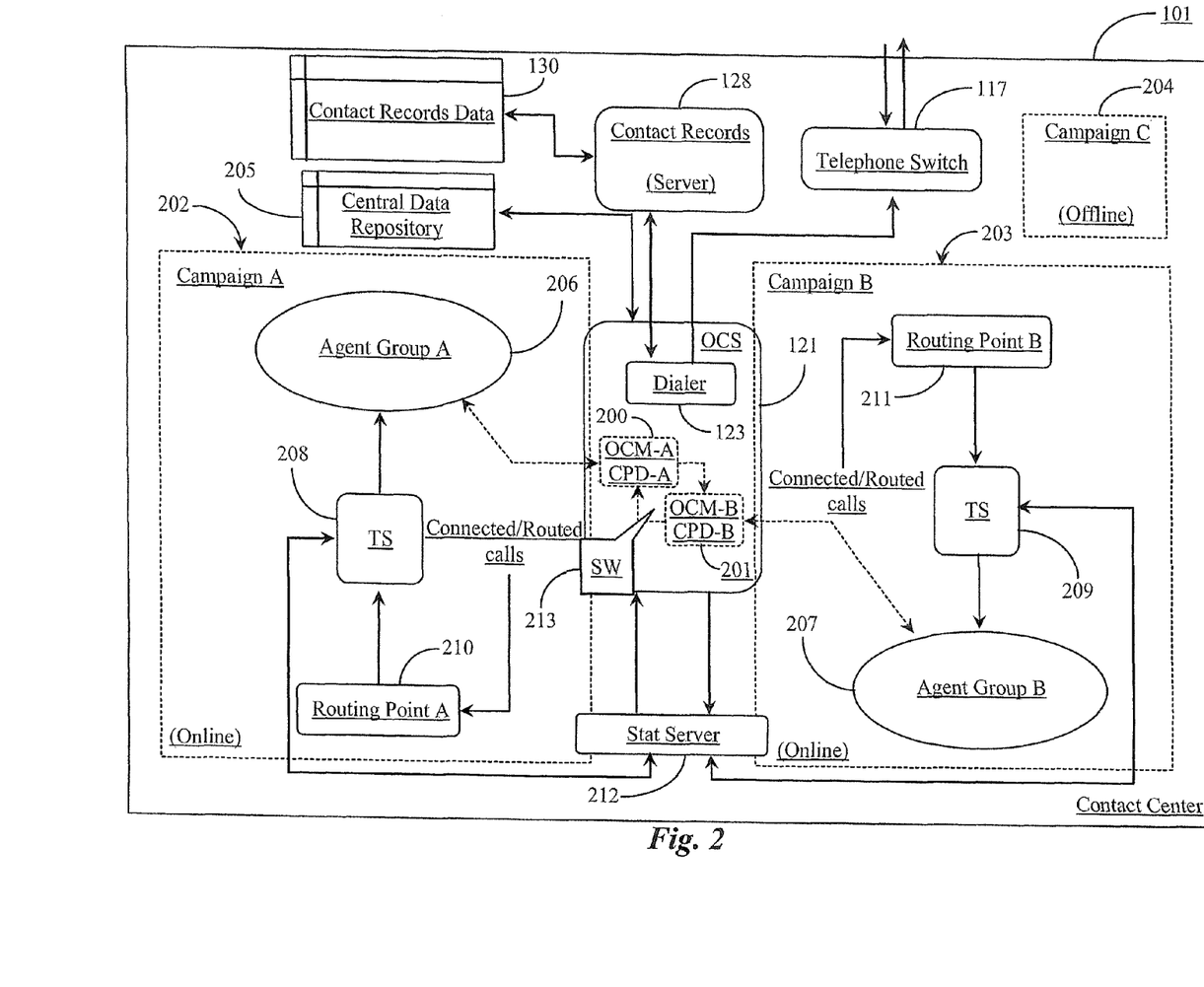
FIG. 2 is a block diagram logically illustrating collaboration between two running outbound customer contact campaigns relative to FIG. 1.

FIG. 2 is a block diagram logically illustrating collaboration between two running outbound customer contact campaigns relative to CC 101 of FIG. 1. CC 101 is illustrated logically and in block form to show components of the system in more detail. Some of the elements that were previously introduced are also illustrated in this example. Those elements will not be re-introduced and retain their same element numbers. OCS 121 has two outbound contact campaigns running simultaneously. These are campaign A (202) and campaign B (203). Campaign A is managed by outbound campaign manager (OCM-A) 200. OCM-A 200 is a SW instance that includes an instance of call progress detection (CPD-A).

Campaign A includes an agent group 206 also termed agent group A in association with campaign A. Agent group A may include local agents defined as agents within the physical domain of the CC, remote agents defined as agents operating from another location like a separate CC or from home, for example. Campaign A has a routing point A (210) for final routing to an available agent. A transaction server (TS) 208 has connection to routing point A and receives routed calls and serves them to agents along with related transaction and customer data required to fulfill the customer's request.

Campaign B includes an agent group 207 also termed agent group B in association with campaign B. Agent group B may include local agents defined as agents within the physical domain of the CC, remote agents defined as agents operating from another location like a CC or from home, for example. Campaign B has a routing point B (211) for final routing to an available agent. A transaction server (TS) 209 has connection to routing point B and receives routed calls and serves them to agents along with related transaction and customer data required to fulfill the customer's request. TS 208 and TS 209 may be a single TS instance without departing from the spirit and scope of the present invention. Agent groups A and B may be selected from agents working within a single call center or from multiple agent resource locations.

Dialer 123 dials numbers for campaigns A and B. Campaign B is managed by an instance 3 of OCM 201, which includes an instance of CPD-B for monitoring call progress. Another outbound contact campaign C (204) has been created but it is currently offline and not running. Campaign C may be assumed scheduled to run and may start at a time when campaigns A and B are still running within the call center. With reference to CC 101 described here and in FIG. 1, dialer 123 places calls to customers through CS 117. Connected calls are detected at the switch and are treated accordingly as connected and routed calls. A statistics server 212 is provided for serving real-time CC statistics to requesting operators and automated systems. Stat server 212 has connection to OCS 121 and to TS 208 and TS 209.

OCS 121 has access to central data repository 205 that is adapted to contain all of the transaction, product, service, and other data that is required for billing, fulfillment, and other operations. Repository 205 may contain a shared memory pool for all of the running campaigns the memory pool adapted to contain data that may be accessed at any time by any running campaign through respective Ohms or otherwise. OCS 121 is connected to CRS 128 and indirectly to CR data 130. OCS receives a CR list from CRS 128 for each different campaign running on the server.

In this example, campaign A and B can collaborate with one another through the respective OCMs 200 and 201. If CPD-A detects that a specific telephone number being dialed for agent group A is a wrong number, OCM 200 may share that data immediately with OCM-B running on the same sever network. Likewise, OCM-B may reciprocate if it detects any states that are configured to be communicated or otherwise should be communicated across campaigns. In one embodiment the receiving OCM is enhanced with a capability of processing received data against a set of rules to determine if there should be any actions taken based on the received or shared data. The data may be recorded and exchanged in a simple text format like extensible markup language (XML) or an HTML/XML derivative of which there are many.

In the system of the present invention, data that may be shared with other campaigns can be collected from every stage of a call attempt and subsequent interaction after the call is routed to an agent. General outbound calling related data may include customer phone numbers, telephony area status, carrier identification, status of the call such as busy, idle, on-call-with-campaign1, call forwarding, and CPD specifics like AM detection, DNC, and so on. Additional types of data that can be collected and shared include campaign contents, call result data such as which agent handled the call and what the business result of the interaction was including cross sell result, up sell result, etc.

Other data that might be collected and shared in real time during campaign activities might include wishes of a customer, the current mood of the customer, any call back preferences, change data relative to customer profile or contact information like address, purchases, credits, traveling plans, etc. Some data that may be published to other campaigns might be collected manually by agents taking calls without departing from the spirit and scope of the present invention.

Another example of data that may be shared is the timing of calls related to destination numbers. It is desirable, for example that one outbound campaign not be dialing the same number as another campaign at the same time, or within a configurable time period. So the statistics from one campaign might be used to select numbers to call and times to dial for another campaign, in a manner to avoid aggravating a potential customer.

In one embodiment the OCM may be adapted with additional SW for publishing data and for subscribing to published data from other running campaigns. In one embodiment the OCM is adapted to replicate data to other running campaign instances. Both negative and positive results relative to customer satisfaction level could be cause for modifying calling patterns or contact records lists. If a customer is angry with an agent after a call is connected, the agent such as one working in group A may communicate the result to OCM-A in OCS 121 via the agent desktop (AD) application. Information may also be acquired through stat server 212.

In one example, outbound campaign C may access repository 205 once it is running on OCS 121 and retrieve any data that may not be expired or outdated. Many data results will be moot after a short period of time. For example, a busy signal encountered after calling a contact number may be shared with all campaigns running at the same time where that contact is in their respective call record lists. The campaigns might delay calling this number if the busy signal was reported before the number was attempted and the number would come up for dialing within a specified time window considered valid for the predicted length of an average busy signal, perhaps for that campaign. That change represents a call records list modification made by the campaigns.

Other collaborative actions might include multiple campaigns spacing shared contact numbers apart relative to that numbers order of appearance on multiple calling lists. For example, campaign A reports that a number is answered and the customer requested a call back. Any other campaigns that receive the data, which includes a timestamp revealing the time the number was first called, can check where the number appears in their records lists and adjust the order of appearance of that number in those lists so that another call to the same number from another campaign will not be attempted before a certain amount of time has passed. If there are three campaigns running simultaneously and they all have a same number in their contact records lists, then by collaborating, the calls to that number can spaced apart in time or the call attempts the three separate campaigns can be brought closer together depending on rules.

The ability for a running outbound campaign to take corrective action based on realtime data shared by another campaign helps to reduce redundancy, improve efficiency, and improve success rate for the calling enterprise and overall satisfaction of customers doing business with the enterprise. Campaigns that are scheduled but not yet started may access data from central repository 205 when they go online. Centrally stored data may expire and be purged before another campaign access it depending on time to live (TTL) configuration for data types. For example, a CPD state indicating a busy signal on a number shared by two or more running campaigns may be pushed to the running campaigns and centrally stored for any other campaign that will be started within the TTL window for that state data.

In one embodiment, OCS 121 includes a collaboration manager implemented as SW 213 running on OCS 121. Campaign collaboration manger serves as a data broker for all of the running campaigns and may in one aspect be enabled to process results for relevancy to each of the running campaigns. Collaboration manager 213 may have access to all of the contact records lists for all of the running campaigns and may be able to determine if any particular data would be relevant to any particular campaign. In this aspect, campaigns that go unaffected do not receive the data.

Figure 3:
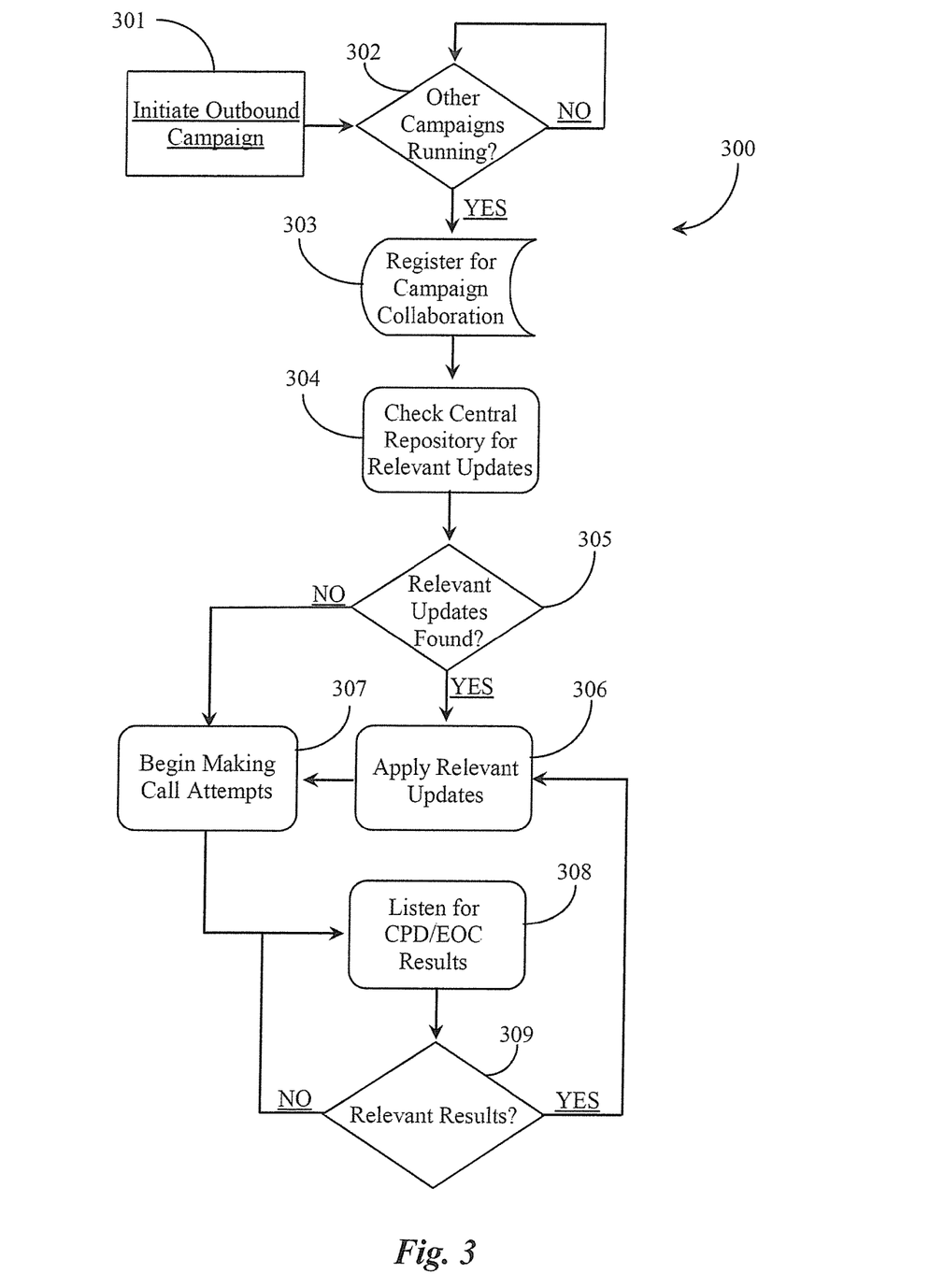
FIG. 3 is a process flow chart illustrating steps for receiving at a running campaign relevant updates collected from one or more other running campaigns relative to FIGS. 1 and 2.

FIG. 3 is a process flow chart 300 illustrating steps for receiving at a running campaign relevant updates collected from one or more other running campaigns relative to FIGS. 1 and 2. At step 301 an outbound customer contact campaign is initiated. At step 302, the campaign determines if any other campaigns are running. If no other campaigns are running then no collaboration occurs and the process may simply loop back periodically until another campaign is detected. If at step 302 one or more other campaigns are running, the new campaign may register for campaign collaboration at step 303. In one embodiment this registration is required before a campaign may collaborate. In this regard there may be an instance where there are two or more running outbound campaigns but one or more of those campaigns are intentionally set not to collaborate with other campaigns.

After registering for collaboration at step 303, the campaign may check a central repository like repository 205 of FIG. 2 for any relevant updates at step 304 that might apply to the campaign calling list or the campaign dialing patterns. In one embodiment relevancy for any updates stored in central repository 205 is determined at the time that the campaign call records list is loaded and available for review. At step 305 the campaign determines if any relevant updates were found in the central repository. If there are data updates found at step 305 that are relevant to the new campaign, the campaign applies those relevant updates at step 306 and begin making call attempts from the contact records list provided for the outbound campaign. If the campaign finds no relevant updates at step 305, the process moves to step 307, and the campaign begins making call attempts.

At step 308, the campaign listens for call progress detection (CPD) results and end-of-call (EOC) results that have been published for share by any other running campaigns. At step 309, the campaign determines if there are any relevant results that should be applied to that campaign. If there are no relevant results at step 309 the process may loop back to listening mode at step 308 while step 307 is ongoing. If the campaign finds relevant CPD or EOC results at step 309 the process loops back to step 306 where those results are applied in the form of modifications made to contact records, dialing patterns, or some other aspect of the campaign that may be adjusted or modified. In one embodiment CPD or EOC results may cause some modification in pacing (frequency of outbound number dialing). Where there are more than one optional pacing algorithms available to the campaign, the relevant result might trigger a switch from one pacing mode to another such as moving from a progressive dialing mode to a predictive dialing mode. There are many possibilities.

While flow chart 300 does not include processing steps, it may be assumed that data results found may be processed against one or more constraints and, or threshold values before relevancy of the data to one or more campaigns is determined. This processing may be performed by the OCM of a campaign that discovers the data or it may be performed by a common mechanism that processes data for all of the running campaigns without departing from the spirit and scope of the present invention.

Figure 4:
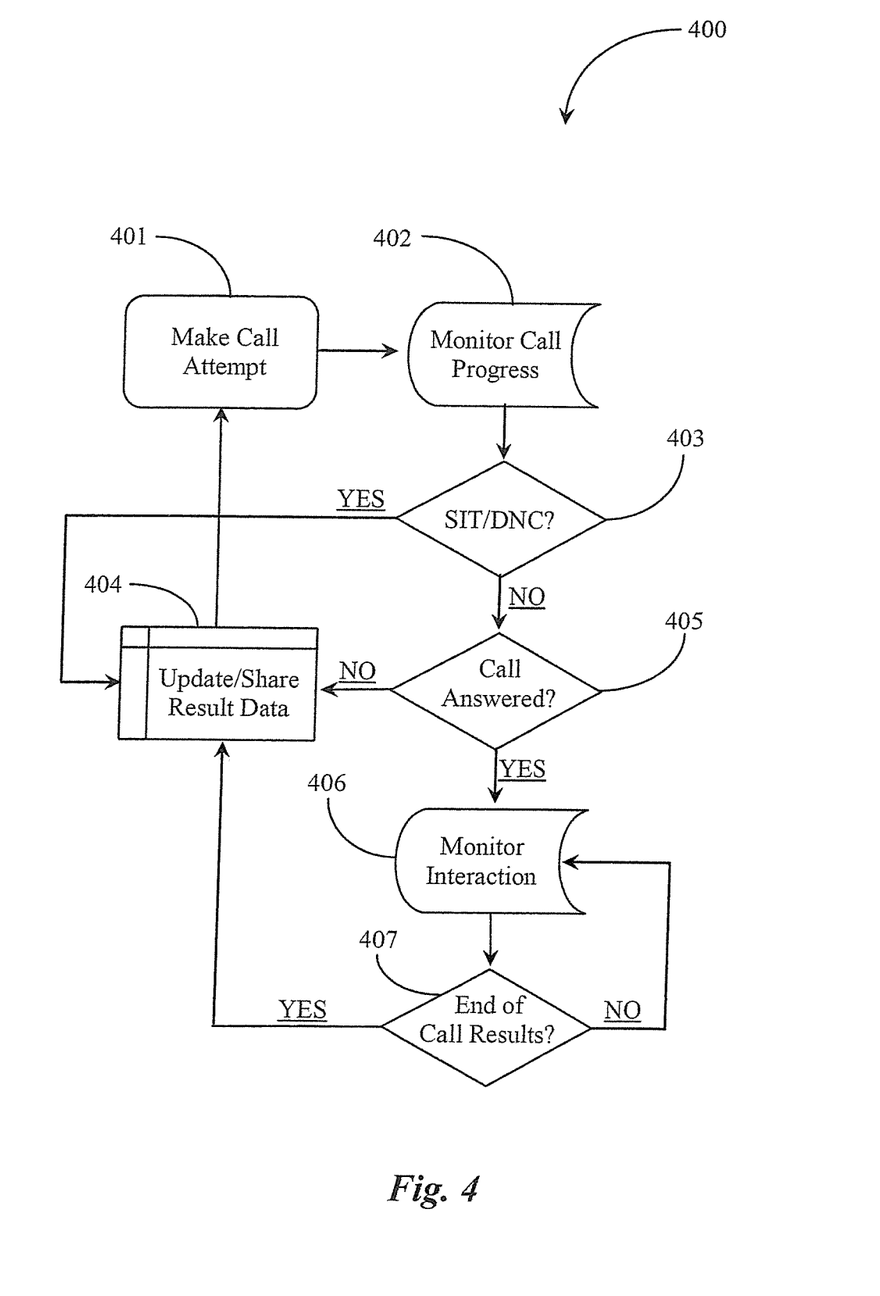
FIG. 4 is a process flow chart illustrating steps for collecting data at one campaign and sharing collected data with one or more other running campaigns relative to FIGS. 1-3.

FIG. 4 is a process flow chart 400 illustrating steps for collecting data at one campaign and sharing collected data with one or more other running campaigns relative to FIGS. 1-3. At step 401a running outbound customer contact campaign makes a call attempt. As the call attempt is in progress, CPD monitors the state of the attempt. At step 403 the campaign determines if for the number dialed if there is a special information tone (SIT) that indicates the number dialed is a wrong number, or if the number dialed is correct but on a do-not-call (DNC) list. Other special states may also be determined at step 403 through CPD monitoring. If the campaign determines at step 403 that the number dialed is a wrong number or on a DNC list, the campaign may update this data to a central data repository and share the result data with any other running campaigns. After sharing CPD results where the call is not answered, the process reverts back to step 401 and the outbound dialer of the OCS system makes a next call attempt from the contact records list provided for that campaign.

If there is no CPD result data to share at step 403 that would preclude an answer (call pickup) by the customer or that would be relevant to other campaigns, the campaign determines if the call is answered by the customer at step 405. If the customer has not answered the call at step 405, the CPD result no answer is shared with other running campaigns back at step 404. If the call is answered by the customer at step 405, then the process begins monitoring the interaction between the customer and an agent or automated treatment system at step 406.

The interaction monitored may be one with a live person (agent) or with some automated assistant or system. At the end of the call, the campaign determines if there are any relevant end-of-call (EOC) results at step 407. An end of call result might be a simple indication of sale or no sale. Another end of call result might be a request for a call back. There are many possible EOC results that can be shared with other campaigns. At step 407 if there are relevant EOC results meaning that these results may be relevant to other campaigns, then the process may resolve back to step 404 where those EOC results will be shared and stored in a central data repository such as repository 205. If there are no significant EOC results to share, the process resolves back to monitoring step 406 for monitoring the next interaction.

It will be apparent to one with skill in the art that the most common EOC result for a sales campaign will be acceptance in the form of a sale, or a rejection in the form of a declination or no sale. Where a sale is offered and the customer is the right customer and of age to accept or to decline the sales offers, there will always be an EOC result of sale or no sale. Overall statistics relative to EOC data may also be shared if those statistics indicate, for example, an above average sales success rate for a particular area code or zip code area, or a below average sales success rate for a particular area code or zip code area.

Figure 5:
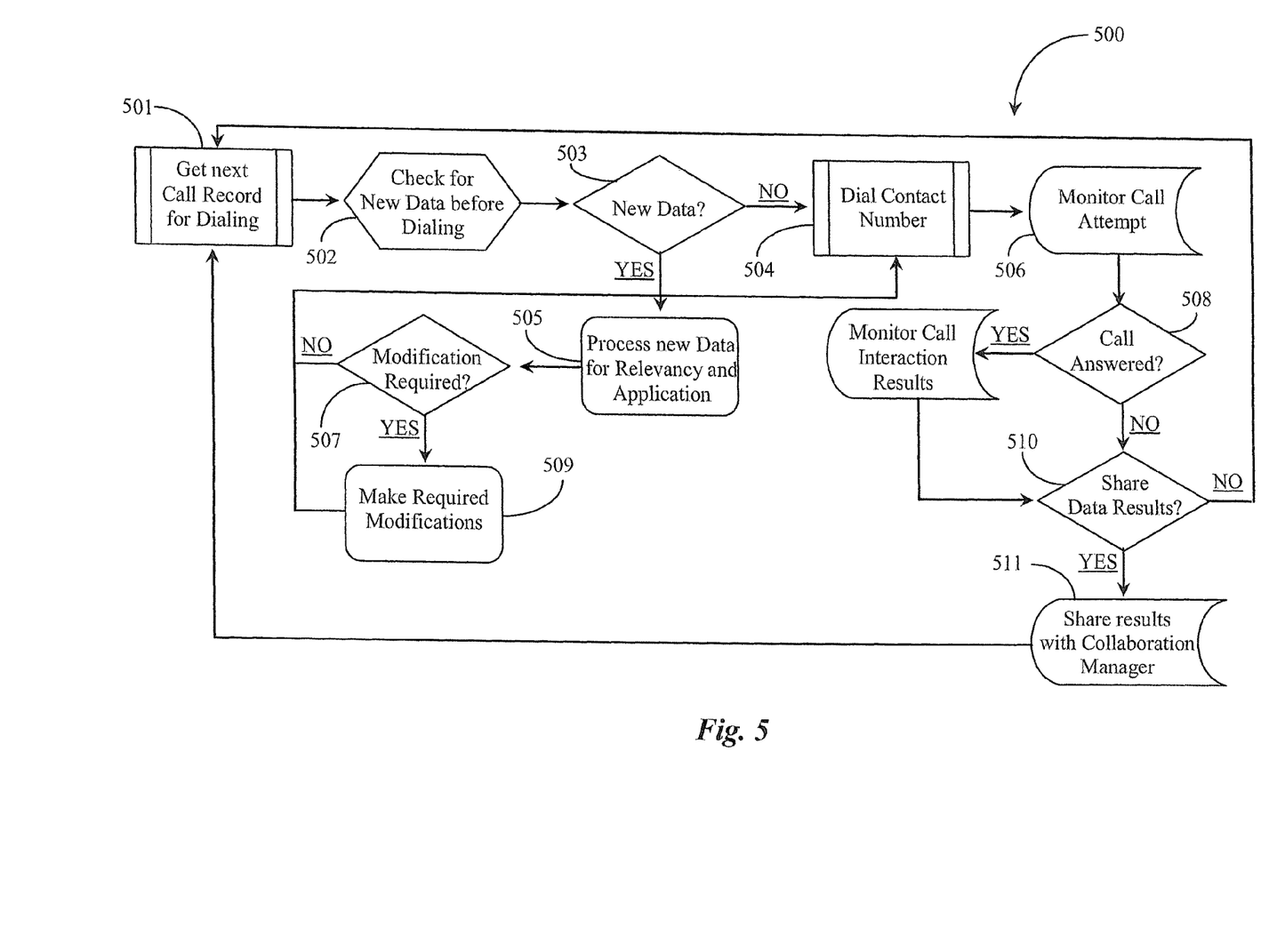
FIG. 5 is a process flow chart illustrating steps for receiving shared data and sharing collected data from the perspective of an outbound customer contact campaign relative to FIGS. 1-4.

FIG. 5 is a process flow chart 500 illustrating steps for receiving shared data and sharing collected data from the perspective of an outbound customer contact campaign relative to FIGS. 1-4. At step 501, a running outbound contact campaign gets the next contact record to dial. At step 502, the campaign may check the central repository for any new data before dialing the number at step 503. If there is any new data that might be relevant to that campaign and customer contact number at step 503, the campaign may process that new data for relevancy and application at step 505.

At step 507 the campaign may determine after processing at step 505 if there is any required modification to call records or dialing patterns. If at step 507 there is no modification required, the process resolves back to step 504 and the campaign dials the contact number. In this case, the new data was not relevant to the contact number, call list, or dialing process so no action is taken. At step 503, if the campaign determines that there is no new data for consideration the process moves directly to step 504 and the contact number is dialed for the next outbound call. In the event that a modification is required at step 507 after processing data at step 505, then the required modifications are made at step 509 and the process skips back to step 504 and the next number is dialed.

In one aspect, the required modification results in aborting the call attempt for the number on deck. An example might be that the data processed at step 505 reveals the customer owning the number about to be dialed has requested in EOC results from another campaign that the company call back the following day. It is also possible that the required modification is not relevant to the current number on deck for dialing. In that case the next number is dialed as modifications are made to the contact records or dialing patterns.

After a contact number is dialed at step 504 by the dialer for a campaign, the system monitors the call attempt using CPD to determine call progress. If any relevant data is detected during CPD monitoring the data is stored centrally and shared with other campaigns as previously described. Steps for this event are described in FIG. 4. At step 508 the system determines if the call is answered. If the call is answered it is routed to an available agent and the interaction is monitored at step 510. In either event of answer or no answer at step 508 the system determines if the discovered data should be shared at step 511. Determining to share the data may be a result of processing the data for relevancy to any other campaign activity occurring in the OCS. In one embodiment the data is shared and centrally stored by default.

If the system determines it will not share the data results of monitoring the call attempt and interaction (if answered), the process resolves back to step 500 and the next call record is accessed for dialing. If the system determines to share the data results at step 511, the results may be shared with a collaboration manager at step 512. A collaboration manager may be a SW instance that handles communications over the campaign network or communications between campaigns such as data publishing and subscription or direct data replication to other running campaign instances. A collaboration manager may be analogous to campaign manager SW 213 described further above with reference to FIG. 2. A collaboration manager may publish or replicate pertinent data results while the sharing campaign dials the next number at step 501.

It will be apparent to one with skill in the art that the collaboration system for outbound contact campaigns can be practiced in a single CC and OCS or in a federated CC environment that uses a centrally located OCS and data repository without departing from the spirit and scope of the present invention. In one aspect more than one OCS is available for dividing or load balancing multiple simultaneous outbound campaigns. It will also be apparent to one with considerable skill in the art that the collaboration system for outbound campaigns is not restricted to voice services. It may also be applied to proactive outbound chat invitation or interaction invitations that are sent to customers browsing the enterprises Website.

It will be apparent to one with skill in the art that the outbound campaign collaboration system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for enabling collaboration between two or more customer contact campaigns running concurrently within a call center environment, the system comprising:
  a processor; and
  a memory, wherein the memory has stored thereon instructions that, when executed by the processor, cause the processor to:
    initiate a first outbound telephony communication as part of a first customer contact campaign of the two or more customer contact campaigns;
    detect, during the first customer contact campaign, relevant data regarding the first outbound telephony communication;
    store the relevant data in the memory;
    calculate a success rate for the first customer contact campaign in a geographic area;
    modify a second outbound telephony communication for a second customer contact campaign of the two or more customer contact campaigns based on the stored relevant data and success rate in the geographic area, wherein the second customer contact campaign runs concurrently with the first customer contact campaign;
    initiate the modified second outbound telephony communication as part of the second customer contact campaign running concurrently with the first customer contact campaign; and
    purge the stored relevant data from the memory in response to detecting a criteria for the purging, wherein in response to the purging, a third outbound telephony communication is initiated without modification based on the relevant data as part of the second customer contact campaign running concurrently with the first customer contact campaign.

2. The system of claim 1, wherein the relevant data comprises call progress detection of the first outbound telephony communication.

3. The system of claim 2, wherein the call progress detection comprises information regarding whether the first outbound telephony communication resulted in a busy signal, no answer, disconnection, or voicemail.

4. The system of claim 1, wherein the relevant data comprises information regarding whether an intended recipient of the first outbound telephony communication was reached.

5. The system of claim 1, wherein the relevant data comprises information regarding whether a contact phone number of an intended recipient of the first outbound telephony communication is correct.

6. The system of claim 1, wherein the relevant data comprises an emotion of a recipient of the first outbound telephony communication.

7. The system of claim 1, wherein the relevant data comprises a business result of the first outbound telephony communication.

8. The system of claim 7, wherein the business result comprises information regarding a purchase or upgrade of a product by a recipient of the first outbound telephony communication, a refusal to purchase or upgrade by the recipient of the first outbound telephony communication, a request for a return call at another time.

9. The system of claim 1, wherein the relevant data comprises profile information of a recipient of the first outbound telephony communication.

10. The system of claim 1, wherein the criteria for the purging comprises a lapse of a set time period.

* * * * *